United States Patent Office 3,202,679
Patented Aug. 24, 1965

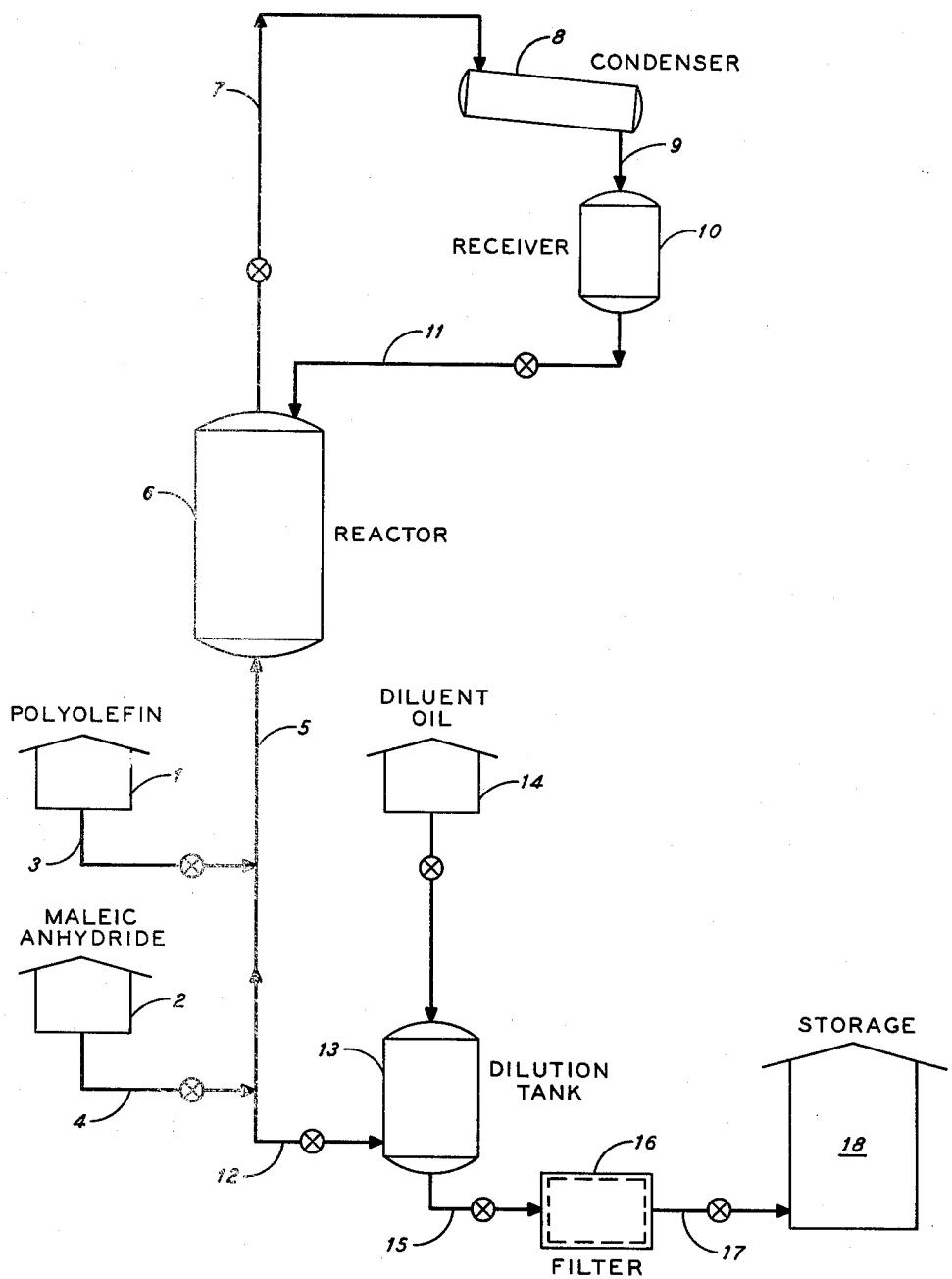

3,202,679
PREPARATION OF ALKENYL SUCCINIC ANHYDRIDES
Harry W. Andrewsen, San Rafael, and Chester D. Gordon, Richmond, Calif., assignors to California Research Corporation, San Francisco, Calif., a corporation of Delaware
Filed June 30, 1961, Ser. No. 121,115
3 Claims. (Cl. 260—346.8)

The present invention relates to a process for producing alkenyl succinic anhydrides. More particularly, it relates to a process for preparing polyisobutenyl succinic anhydrides.

High molecular weight alkenyl-substituted succinic anhydrides prepared by reacting maleic anhydride with polymers of $C_2$-$C_4$-alkylenes with average molecular weights ranging from about 200 to about 2000, and preferably from about 700 to about 1200, represent attractive intermediates for the preparation of many valuable industrial materials. Particularly valuable among these anhydrides are polyisobutenyl succinic anhydrides which can be converted into different chemical compounds suitable as additives to lubricating oils, automotive fuels, and the like. These last-mentioned anhydrides are prepared by reacting maleic anhydride with polyisobutene of an average molecular weight in the range from about 200 to about 2000, and preferably from about 700 to about 1200, at temperatures which may vary from about 400 to about 480° F., maintaining a relatively low charge ratio of maleic anhydride to polyisobutene, namely, from about 0.3 to about 2.0 on the mol basis, for a time sufficient to assure the maximum conversion of polyisobutene to the polyisobutenyl succinic anhydride.

The conversion rate in the manufacture of these high molecular weight alkenyl-substituted succinic anhydrides is a function of the concentration of maleic anhydride in the single-phase reaction solution where the alkylene polymer is the predominant solvent at the start of the reaction and where the corresponding succinic anhydride becomes the predominant solvent towards the end of the reaction. This rate increases with the increasing concentration of maleic anhydride and with the increasing temperature. Reaction pressure is also critical and influences the conversion rate. If the pressure is lowered at a selected temperature, the conversion rate decreases. Also, by a suitable control of the pressure one is able to maintain a high concentration of maleic anhydride in solution in the hydrocarbon-rich phase in the reaction zone, while preventing appearance of a separate maleic anhydride-rich phase. Since the effects of pressure and temperature are found to be interrelated, it would seem at the first glance that, by suitably correlated increases of the reaction temperature and pressure, one should be able to achieve the desirable optimum of conversion, somewhere in the neighborhood of 90% and higher.

However, this is found not to be so easy and simple. For instance, in the reaction of polyisobutene and maleic anhydride at a temperature above about 300° F., when the temperature of the reaction is increased, the degradation of maleic anhydride, which always occurs to a certain degree, though slowly, upon heating this material, will be correspondingly boosted, causing formation of larger quantities of carbon dioxide, water and polymeric resins. The same thing happens when the pressure is being increased in the reaction between polyisobutene and maleic anhydride within the operative range of temperatures from about 400 to about 480° F. If traces of alkali or alkaline earth metal ions, such as sodium or calcium, are present in the reaction equipment, the degradation is even further intensified. The consequent wastage of maleic anhydride owing to this resin formation is obviously undesirable. The resulting polymeric resins are either non-crystalline, black, tar-like solids, which must be separated from the reaction product by filtration or, and this is particularly true of the resins formed at temperatures close to 400° F., are liquids partly dissolved in the solution of the reaction product, in which case conventional separation methods, such as filtration, are of no avail.

In order to maximize conversions and to minimize the aforementioned formation of both solid and soluble degradation products, the reaction between the $C_2$-$C_4$-alkylene polymers (polyolefins) and maleic anhydride is carried out with a continuous maleic anhydride reflux. The reflux rate should be in excess of the reaction requirements for maleic anhydride. In this manner, the reaction solution is kept saturated with maleic anhydride throughout the whole reaction. Any maleic anhydride which is in excess of that required to saturate the reaction solution continuously distills from the reaction zone overhead, avoiding thereby appearance of a separate maleic anhydride phase in the reactor and the consequent contamination of the succinic anhydride product and fouling of the equipment by the products of degradation of maleic anhydride. However, in this operation, that is with reflux and at temperatures in excess of 400° F., although the conversion rate is increased and the formation of resins and tars is minimized, other difficulties are being created, as will be explained hereinafter.

Some moisture is almost invariably present in the polyolefinic reactant material, even though it may have been thoroughly dehydrated beforehand. Furthermore, there will be water formed as a result of the side reaction of degradation of maleic anhydride, and some moisture will be left present in the process equipment despite the usual careful dehydration thereof. The water thus made available in the reaction zone will also go overhead the way of the maleic anhydride, and, upon condensation, it will react with the maleic anhydride in an overhead receiver provided for the accumulation of this unreacted material, whence it is recycled to the reactor.

Upon contact with water, maleic anhydride rapidly forms maleic acid. As a matter of fact, commercial maleic anhydride employed as a reactant in the presently described process, may already contain from about 0.1 to about 0.2%, by weight, of maleic acid, the figure of 0.3%, by weight, being the maximum tolerated in industrial specifications. Consequently, it is extremely important that the quantity of water, which may contact the unreacted maleic anhydride being collected in the receiver provided for its recycle to the reaction zone, be as small as possible. Water which enters the reaction zone as a contamination of the polyolefin reactant and water produced in this zone, as a result of the side reaction of degradation of maleic anhydride, during the reaction of formation of the alkenyl-succinic anhydride, is immediately flashed out of the reactor and dissolves next in the maleic anhydride which is being collected in the receiver of the recycle system before this unreacted maleic anhydride is sent back to the reactor as reflux.

Maleic acid is slightly soluble in the maleic anhydride at the preferred operating temperatures in the receiver from about 140° to about 200° F. and, on reaching at 160° F. a concentration of 3%, by weight, it will separate out and plug the lines and valves in the system. Its isomer, fumaric acid, has a very low solubility in maleic anhydride (practically nil below 200° F.) The malic acid formed on contact of water with the maleic anhydride in the overhead receiver slowly and irreversibly isomerizes to fumaric acid which is even less soluble in maleic anhydride. The result is precipitation of a portion of the maleic acid, of the fumaric acid, and of mixed deposits of fumaric and maleic acids in the receiver; these deposits interfere with the efficiency of the process and tend to plug and to foul the equipment, such as the interior of different vessels, lines and valves. Any maleic acid dissolved in the maleic anhydride and refluxed therewith to the reaction zone will immediately decompose therein, yielding maleic anhydride and some water, and this water will again distill overhead. Thus, as time goes on, the entire water inventory in the system will collect in the overhead receiver, and the concentration of maleic acid therein will rapidly increase with the decreasing inventory of maleic anhydride.

A vicious circle thus obtains: if the process is operated with reflux at temperatures in excess of 400° F. to improve the conversion and to minimize the wastage of maleic anhydride due to the formation of tar-like resinous polymers, the water of reaction and other moisture that may be present in the system will react in the overhead receiver with the maleic anhydride recycle and will cause formation of maleic acid. This acid is but partly soluble in maleic anhydride, and a substantial amount of this acid will isomerize at this temperature level to fumaric acid. This latter is insoluble in maleic anhydride and will deposit itself in the receiver in the form of fine crystals and in mixture with the solid-phase maleic acid. Moreover, upon returning to the reactor the portion of maleic acid which became dissolved in the maleic anhydride recycle will continue to contribute to the formation of more degradation products (resins) and thus will continue to waste the maleic anhydride.

It has now been found that satisfactory production of alkenyl-substituted succinic anhydrides, and more particularly of polyisobutenyl succinic anhydrides, at high conversions and with the minimum wastage of maleic anhydride can be achieved by carrying out the reaction between the high molecular weight polyolefin and maleic anhydride at a temperature in excess of 400° F. and under a pressure less than the vapor pressure of liquid maleic anhydride at the particular reaction temperature, so as to prevent formation of a separate maleic anhydride phase, for a period of time, as a rule not exceeding 12 hours, following which period the entire contents of the maleic anhydride receiver is transferred at once into the reactor, and the temperature of this latter is reduced to from about 380 to about 350° F. for a period of time sufficient to isomerize essentially completely all and any maleic acid in the receiver to fumaric acid. During this isomerization treatment, the reactor remains shut off from the supply of fresh maleic anhydride. Once the isomerization step is completed, the excess (unreacted) maleic anhydride is allowed to distill overhead into the receiver, and the remaining reaction product solution stripped of this unreacted maleic anhydride is discharged from the reactor for further processing, namely, to be diluted with a neutral hydrocarbon oil before being sent on to an appropriate filtering unit, where all insoluble impurities including the readily filterable fumaric acid are captured to yield finally an essentially pure polyolefin (alkenyl)-substituted succinic anhydride product.

The aforedescribed manner of operation is illustrated by the simplified flow diagram of the process for the manufacture of alkenyl-substituted succinic anyhdrides, submitted in the attached drawing.

In this drawing, numerals 1 and 2 designate two storage tanks containing a polyolefin, for instance, polyisobutene, and maleic anhydride, respectively. The two reactants are charged through corresponding lines 3, 4 and 5 into the reactor 6, the ratio of maleic anhydride to polyisobutene (on the mol basis) being in the range from about 0.3 to about 2.0. Maleic anhydride is distilled overhead via line 7 into an overhead condenser 8 and thence via line 9 into an overhead receiver 10, from which it is pumped (recycled) through line 11 to reactor 6. The reaction is carried on at the optimum conversion rate, which would depend on the temperature (in excess of 400° F.) and the corresponding pressure employed, until the desired extent of reaction is reached or the quantity of water produced by the reaction becomes too large and is apt to cause an excessive precipitation of maleic acid and excessive isomerization thereof to fumaric acid. The time when this occurs is ascertained by closely analyzing samples of the reaction mixture for the conversion to alkenyl-substituted succinic anhydride or samples of the recycle maleic anhydride solution in receiver 10. When the samples of maleic anhydride indicate that the content of maleic acid approaches the critical level at the particular temperature and pressure of reaction, which will take place at least 4–5 hours after the beginning of the reaction, all of the maleic anhydride solution in receiver 10 is rapidly pumped into reactor 6, and the valves on lines 3, 4, 7, 11 and 12 leading to and from this reactor are closed. The temperature in reactor 10 is then reduced to from 380 to 350° F., and the contents of the reactor are held at this temperature for a period of time sufficient to isomerize substantially completely the maleic acid to fumaric acid. This takes from about 1½ to about 3 hours. Thereupon the valve on line 7 is opened, and the excess (unreacted) maleic anhydride is distilled back (stripped off) to receiver 10. The remaining stripped reaction product mixture in reactor 6 is then pumped through lines 5 and 12 to tank 13 where it is blended (diluted) with neutral hydrocarbon oil from storage tank 14. The resulting oil dilution, after a suitable "soaking" period at a temperature of 190–210° F. is sent through line 15 to be filtered in a suitable filtering apparatus 16, e.g., a conventional plate and frame filter, in order to remove all solids (resins, fumaric acid, etc.). From the filter, the filtrate product, essentially pure alkenyl-substituted succinic anhydride, is sent through line 17 to storage tank 18.

In a typical example of operation of the process described, overhead receiver 10 contained at the start of operation 7,570 lbs. of maleic anhydride from the previous operating cycle. A charge of 18,410 lbs. of polyisobutene (average mol wt. 930) was pumped from tank 1 through lines 3–5 into reactor 6. At the same time, a charge of 1,080 lbs. of maleic anhydride was pumped from tank 2 through lines 4 and 5 into the reactor which was then heated to 460° F. at a pressure of 10 p.s.i.g. The valve in line 7 leading to overhead condenser 8 was opened to allow maleic anhydride to distill over into receiver 10. When the reaction temperature reached 455° F., the maleic anhydride in the receiver was pumped through line 11 back to reactor 6 to maintain a reflux. At the end of about 5 hours, all of the maleic anhydride in receiver 10 was pumped quickly into reactor 6, and the valves to this reactor were closed. The temperature of the reactor was allowed to drop to 365° F., and the contents were held at this temperature for 2 hours in order to permit the isomerization of nearly all of the maleic acid to fumaric acid. When the isomerization was completed, the valve on line 7 was opened, and the unreacted maleic anhydride was distilled over into receiver 10. The contents of reactor 10, altogether 25,270 lbs., were then pumped to tank 13 and blended with 17,610 lbs. of diluent hydrocarbon oil (150 neutral). The recovery of polyisobutenyl succinic anhydride after filtration amounted to 18,520 lbs. The quantity of filtered off solids (resins and fumaric acid) was equal to 610 lbs.

It is usually preferred to carry out the transfer of maleic anhydride recycle and the step of isomerization of maleic acid to fumaric acid at the end of the reaction between the polyalkylene and maleic anhydride. However, if desired, the isomerization step may be undertaken at the beginning of the operating cycle. In this case, the initial charge of maleic anhydride in the receiver from the preceding operating cycle, which may contain on admission into the reaction vessel up to 2.0 to 3.0%, by weight, of maleic acid, is transferred to and maintained in this latter vessel at a temperature from about 350 to about 380° F., in order to isomerize the maleic acid impurity to fumaric acid. Once the isomerization is completed, the temperature is raised above 400° F., and the excess of maleic anhydride is permitted to distill over and pass on to the receiver. This anhydride will have but very little maleic acid dissolved in it.

Another variant, whenever the circumstances permit and warrant to do so, consists in employing more than one receiver for the distillation and recycle of excess maleic anhydride. In this case, at an appropriate time during the operating cycle, one receiver is disconnected and its contents are subjected to the lower temperature treatment in order to isomerize the maleic acid impurity independently from the process system. Meanwhile, another receiver is switched into the reaction system, until the first receiver is again made available, after removal of the maleic acid and fumaric acid impurities therefrom in any suitable known manner.

As already indicated above, both reactants, the polyolefin ($C_2$–$C_4$ alkylene polymer) and the maleic anhydride, employed in the production of corresponding substituted succinic anhydrides should be as anhydrous as possible and should be protected from contact with moisture.

Equally important is the complete dehydration of the reaction system, that is, the storage tanks, lines and valves, reactors, condensers and receivers.

As previously mentioned in this description, polyisobutenyl succinic anhydrides derived from polyisobutene materials characterized by average molecular weights in the range from about 200 to about 2000, and preferably from about 700 to about 1200, are particularly interesting to the industry as intermediates for the manufacture of valuable succinimide-type additives to lubricating oils, hydrocarbon fuels, etc.

Very satisfactory polyisobutenyl succinic anhydrides of enhanced quality and at greatly reduced manufacturing cost can be produced at high reaction temperatures (above 400° F.) and with higher conversions by employing the isomerization step for converting the maleic acid impurity to fumaric acid which is easily removable by filtration and other conventional techniques from the ultimate succinic anhydride product.

The preferred operating conditions for the manufacture of this valuable polyisobutenyl succinic anhydride intermediates are: mol ratios of maleic anhydride to polyisobutene ranging from about 0.3 to about 2.0; reaction temperatures from about 400 to about 480° F., and most desirably from about 440 to about 470° F.; and pressures less than the vapor pressure of liquid maleic anhydride at the aforementioned reaction temperatures, while carrying out the reaction for a period from about 4 to about 12 hours. Usually, from 4 to about 7 hours is adequate. The isomerization step should be carried out at temperatures from about 380 to about 350° F. for a period of time which occupies from about 1½ to about 3 hours, whether applied at the end or at the beginning of the process.

It is to be understood that various modifications of the invention can be practised by those skilled in the art without departing from the scope or spirit of this disclosure, and that these modifications are therefore to be included within the scope of the following claims.

We claim:
1. In the process of preparing alkenyl-substituted anhydrides of succinic acid by reacting polymers of $C_2$–$C_4$ alkylenes characterized by an average molecular weight in the range of 200 to 2000, with maleic anhydride, at a temperature in excess of 400° F. and under a pressure less than the vapor pressure of liquid maleic anhydride at said temperature, the method of converting maleic acid impurity in the reaction system to the readily filterabe fumaric acid by reducing the reaction temperature to from about 380 to about 350° F. for a period of time sufficient to isomerize substantially completely the maleic acid to fumaric acid.

2. In the process of preparing polyisobutenyl succinic anhydrides by reacting polyisobutene characterized by an average molecular weight in the range of 700 to 1200, with maleic anhydride, at a temperature from about 400 to about 480° F. and under a pressure less than the vapor pressure of liquid maleic anhydride at said temperature, the method of converting maleic acid impurity in the reaction system to the readily filterable fumaric acid by reducing the reaction temperature to from about 380 to about 350° F. for a period of time sufficient to isomerize substantially completely the maleic acid to fumaric acid.

3. A process for producing alkenyl succinic anhydrides, which comprises:
(1) forming an approximately saturated solution of maleic anhydride in a $C_2$–$C_4$ alkylene polymer having a molecular weight in excess of 200 in a reaction zone maintained at a temperature of about 400 to about 480° F. and at a pressure not exceeding the vapor pressure of maleic anhydride at the maintained temperature;
(2) allowing liquid maleic anhydride present in excess of the amount which will dissolve in the reaction solution under said conditions of temperature and pressure to distill off as vapor from the reaction zone;
(3) condensing the thus withdrawn maleic anhydride vapors and passing the condensate into a maleic anhydride receiving zone;
(4) continuously returning the condensed liquid maleic anhydride from said receiving zone into said reaction zone to maintain in this latter a substantially saturated maleic anhydride concentration;
(5) just prior to the time when the solubility of maleic acid in the maleic anhydride solution in the receiving zone is exceeded, dumping the entire maleic anhydride content of said receiving zone into said reaction zone;
(6) reducing the temperature of the reaction zone to from about 380 to about 350° F.;
(7) maintaining the content of the reaction zone at the reduced temperature for a time sufficient to isomerize maleic acid in the maleic anhydride solution essentially completely to fumaric acid;
(8) thereupon evaporating reacted maleic anhydride from the reaction zone; and
(9) separating fumaric acid from the reaction product.

References Cited by the Examiner

UNITED STATES PATENTS

| | | | |
|---|---|---|---|
| 2,142,980 | 1/39 | Huijser et al. | 260—78.4 |
| 2,973,344 | 2/61 | Fasce | 260—78.4 |
| 3,018,291 | 1/62 | Anderson et al. | 260—326.5 |

OTHER REFERENCES

Fieser, Organic Chemistry (third edition, 1956), page 281.

NICHOLAS S. RIZZO, *Primary Examiner.*

IRVING MARCUS, WALTER A. MODANCE,
*Examiners.*